United States Patent [19]
Brotby

[11] Patent Number: 4,785,361
[45] Date of Patent: Nov. 15, 1988

[54] METHOD AND APPARATUS FOR FRUSTRATING THE UNAUTHORIZED COPYING OF RECORDED DATA

[75] Inventor: W. Krag Brotby, Pasadena, Calif.

[73] Assignee: Vault Corporation, Newbury Park, Calif.

[21] Appl. No.: 943,389

[22] Filed: Dec. 16, 1986

Related U.S. Application Data

[63] Continuation of Ser. No. 922,824, Oct. 22, 1986, which is a continuation of Ser. No. 439,907, Nov. 8, 1982, abandoned.

[51] Int. Cl.$^4$ .............................................. G11B 15/04
[52] U.S. Cl. ........................................... 360/60; 380/4
[58] Field of Search ............................. 380/4; 360/60

[56] References Cited
FOREIGN PATENT DOCUMENTS 84441  7/1983  European Pat. Off. .
105241 4/1984  European Pat. Off. .

Primary Examiner—Vincent P. Canney
Attorney, Agent, or Firm—Blakely, Sokoloff, Taylor & Zafman

[57] ABSTRACT

Authorized disks made in accordance with the invention are physically distinguishable from the blank disks which would be used for making unauthorized copies. A security check procedure is included in the initializing routine that is recorded on the authorized disk and that is executed prior to the reading out of any of the protected data. The security check procedure involves a test to determine whether the disk on which it has been recorded has or does not have the physical fingerprint that is the hallmark of an authorized disk. If the fingerprint is absent, the security check procedure prevents the protected material from being read out. Thus, unauthorized copies are useless because the protected data cannot be read out of them.

2 Claims, 1 Drawing Sheet

METHOD AND APPARATUS FOR FRUSTRATING THE UNAUTHORIZED COPYING OF RECORDED DATA

This is a continuation of application Ser. No. 922,824 filed 10/22/86 which is a continuation of application Ser. No. 439,907 filed Nov. 8, 1982, now abandoned.

BACKGROUND OF THE INVENTION

The present invention is in the field of computer memory devices and more specifically relates to a combination of method and apparatus that frustrates the unauthorized copying of protected data that has been recorded on a floppy disk or other memory medium.

Billions of dollars are spent each year for computer software. Typically the software is sold in recorded form on a floppy disk. Once the consumer has read the program into the core of his computer from the floppy disk, it is conceivable that the consumer might read the program out of the core and record it on a second floppy disk, thereby creating an unauthorized copy of the program. It has been estimated that 50 percent of all software has been copied without authorization.

The proprietor of the software that has been recorded on an authorized copy and sold to a consumer wishes to prevent the consumer from making and selling unauthorized copies. The present invention permits copies to be made, but with the present invention the copies are unusable and therefore of no value.

Typically, the instructions and other data recorded on the disk at the factory include an initializing procedure and a main application program. The initializing procedure takes care of formatting and other operational formalities, including the setting up of an operating system directory that tells the computer the actual location, within the hardware, at which certain files will be found.

THE PRIOR ART

In U.S. Pat. No. 4,214,280 issued July 22, 1980 to Halfhill, et al., there is disclosed a method and apparatus for recording data on a disk having defective areas. The method involves locating the defective area so that the data can be written on the parts of the disk that are not defective. The invention is directed, not to securing the recorded data against copying, but instead, toward permitting defective disks to be used. The defects are not introduced intentionally, and no attempt is made to write data on the defective areas.

In an article entitled "Recorded Data Security Device" by A. F. Shugart in the IBM Technical Disclosure Bulletin, Vol. 4, No. 10 of March 1962, there is described a device that prevents certain protected data from being read out of a disk memory. The disk memory in this instance consists of at least two disks mounted for rotation on a common shaft. One of the disks contains recorded control signals that control the operation of the read/write heads of the remaining disks. In response to security signals on the first disk, the read/write heads of the remaining disks are electrically disconnected from their amplifiers, thereby preventing read-out of the protected data. Although this invention makes use of a special channel for security purposes, the use made of that channel is completely different from the techniques employed in the present invention.

In U.S. Pat. No. 4,086,634, issued April 25, 1978, Cook discloses a method and apparatus for preventing unauthorized duplication of magnetic tapes. The method involves recording a high-frequency modulated signal together with audible program material on a magnetic tape so that subsequent copying of the program material and modulated signal onto an unauthorized magnetic tape with conventional high frequency bias recording will produce on the copied tape detectable and identifiable interference signals which will produce an audible playback noise that spoils the copied tape. Although Cook's invention is directed toward preventing unauthorized duplication of recorded material, his method is entirely different from the technique used in the present invention.

It is anticipated that a separate prior art statement will be lodged in the file of the present application. The present inventor is not aware of any prior art that anticipates or suggests the present invention.

SUMMARY OF THE INVENTION

The present invention is intended primarily for use with floppy disks on which software has been recorded and which are mass distributed to consumers. A major objective of the invention is to prevent the consumer from making an unauthorized copy of the authorized copy which he has purchased.

The consumer certainly has the right to use his authorized copy for its intended purpose, and for this reason, inventions which deny access to the recorded data are not applicable to the problem at hand. In contrast the present invention falls into the class of techniques for preventing unauthorized duplication of the protected material, i.e., the production of an unauthorized disk. At the same time the present invention does not impair an unauthorized disk. At the same time the present invention does not impair the consumer's right to read the protected material.

As will be seen below, the present invention cannot prevent the consumer from attempting to transcribe the protected material onto an unauthorized disk, but the present invention does guarantee that the unauthorized copy will be unusable.

The present invention requires a combination of apparatus and method for its practice.

Authorized disks made in accordance with the present invention are physically distinguishable from the blank disks which consumers would use for making unauthorized copies. In some embodiments of the present invention, the modifications which characterize the authorized disks are relatively simple and not readily detected. The physical features (indicia) which distinguish the authorized disks may be thought of as an identifying fingerprint for that disk.

The method aspect of the present invention is centered about a security check procedure that is incorporated into the initializing routine that is recorded on the authorized disk and that is executed prior to the reading out of any of the protected data. The protected data may typically be an application program, but in other circumstances the protected material may comprise data in various forms, including (without limitation) binary signals and analog signals.

The initializing routine must be executed before the protected material can be read out of the disk, and the read/write head of the computer is under control of the initializing routine.

The security check procedure involves a test to determine whether the disk on which it has been recorded has or does not have the physical fingerprint that is the hallmark of an authorized disk. If the fingerprint is present, the security check procedure enables the read/write head to read out the protected material; however, if the fingerprint is absent, as it would be from an unauthorized disk, the security check procedure prevents the read/write head from reading out the protected material.

In a preferred embodiment, if the fingerprint is not present, the security check procedure instructs the read/write head to obliterate or to erase the protected material.

Thus, the material recorded on a disk, including the initializing routine as well as the protected material, may be transcribed to an unauthorized disk. The recorded material will be identical o the authorized disk and on the unauthorized disk.

However, upon attempted use of the unauthorized disk, the security check procedure will determine that the distinguishing fingerprint that characterizes an authorized disk is absent, and at that juncture the security check procedure will prohibit read-out of the protected material or will obliterate it.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DETAILED DESCRIPTION OF THE PREFERRED EMBODIMENTS

First Embodiment

Figure 1:
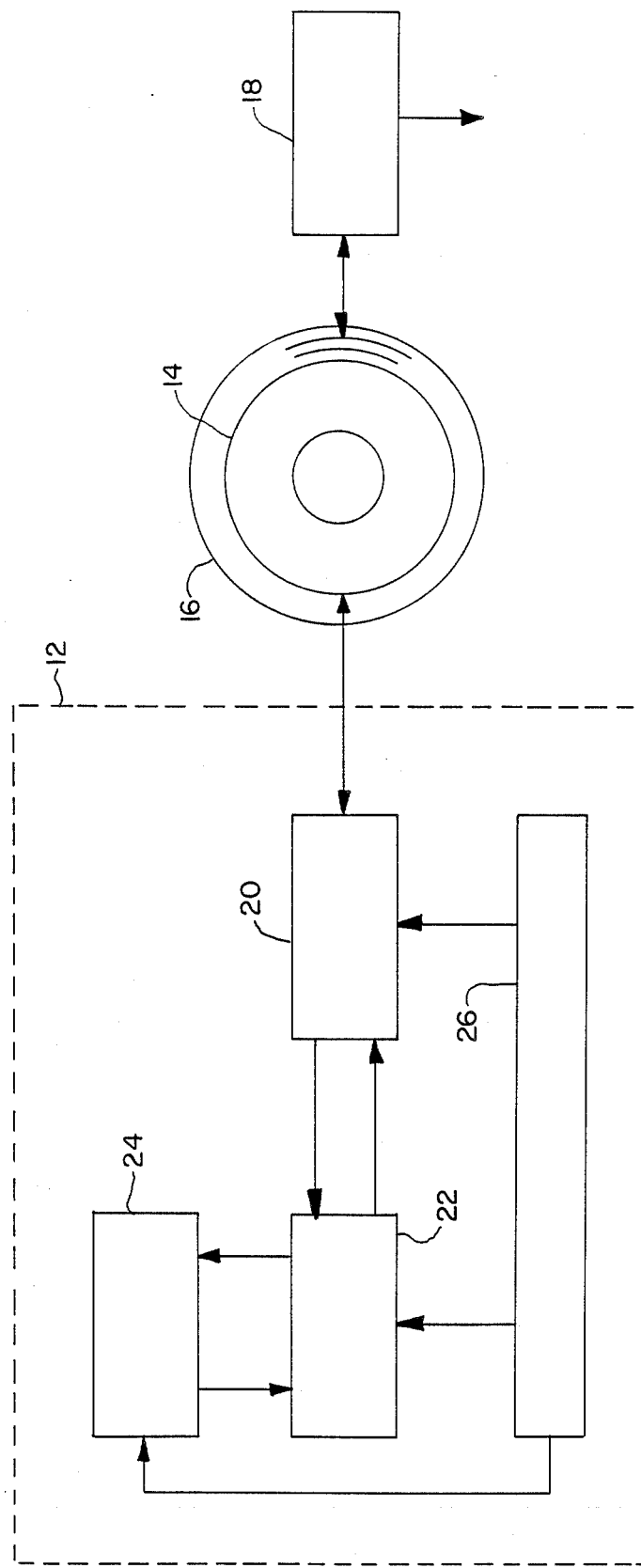
FIG. 1 a block diagram showing the apparatus used in the third embodiment of the invention.

In a first embodiment of the invention, which is preferred for its simplicity, a localized permanent defective area is intentionally created at the factory on the unrecorded disk at a random location on the recording surface, on the portion of the recording surface reserved for the material to be protected. The effect of the defect is to render the affected portion of the disk incapable of accurately reading out a piece of data that previously a write head had attempted to record on the defect.

Thereafter, at the factory, the exact location of the defect on the disk is determined. In one embodiment this is accomplished by recording 1's at all locations and then reading back the data. Those locations from which 1's are not read back constitute the defective area.

The locations constituting the defect are collectively regarded by the computer as a file (call it File D), and the location of this file is stored in the initializing procedure that is recorded on the disk. The initializing procedure also includes steps which constitute the security check.

At this point the main application program or other data to be protected may be recorded on the disk at the factory. Alternatively, at this point the disk may be sold to someone who wants to record a secure program on the disk.

Thereafter, every time the disk is played, the initializing procedure including the security check is executed. The security check procedure includes the steps of opening File D, writing a particular piece of data there, closing the file, re-opening File D, reading out the contents, and comparing the contents with the particular piece of data that was written.

If the read-out data is identical to the written data (as would be the case if the disk were an unauthorized copy not containing a defect) the security check procedure orders the files in which the protected data is stored to be opened and the contents to be obliterated.

If the read-out data differs from the data that was written (as is normal for an authorized disk since it contains a defect) the security check procedure enables the protected data to be read. Thus, an unauthorized copy of the disk will not yield the protected data, thereby frustrating unauthorized copying.

Second Embodiment

In a second embodiment, which permits a higher level of security than the first embodiment, a special recording medium is used on one band of the disk. This band may include several tracks.

The special recording medium is a material that can be recorded on by a special recording head at the factory where the disk is produced, but which cannot be written on by the read/write head of any computer with which the disk might be used.

In one embodiment, the special recording medium is a ferromagnetic material having such large domains that the domains can only be magnetized by application of a magnetic field greater than that produced by the read/write heads of existing computers.

In another expression, the special recording medium is a "harder" magnetic material than the material used on ordinary floppy disks so that the limited magnetic field produced by the write heads of existing computers cannot write on the special recording medium. Also, the special recording medium should have a coercivity that is large compared to the magnetic field produced by the write/erase heads of existing computers so that data written in the special recording medium cannot be erased by the computer.

The tracks on which the special recording medium are used thus constitute a read-only memory which the computer's read/write head can read but cannot write on or alter.

When the disk is produced at the factory, the special recording head there writes a permanent "fingerprint" number (such as a string of 1's) onto the tracks of the special recording medium.

An initializing procedure of the program commands that the file located at the special tracks be opened and that the file be filled with 0's.

Now, if the disk is a normal disk onto which the program has been copied without authorization, this command will be carried out, and the file at the location of the special tracks will be filled with 0's.

But, if an authorized disk (one which includes the special tracks) is the one being played, the computer's recording head will be unable to affect the special tracks, which will continue to hold the "fingerprint" number.

The security check then calls for reading the file. If only 0's are read, the security routine commands that all files, including the main application program, be opened and be filled with meaningless numbers, thereby rendering the copy useless. If the "fingerprint" number is read, the security check routine will enable read-out of the main application program.

Third Embodiment

A third embodiment, shown in FIG. 1, permits a higher degree of security to be attaind than is possible with the first and second embodiments. However, the third embodiment requires special apparatus 12 that is an integral part of the jacket of the disk.

In the third embodiment, one track 14 of the disk 16 is dedicated for exclusive use with the security check procedure. When the disk 16 leaves the factory and before it has been used, this dedicated track contains a sync signal followed by a File X that contains a definite number $N_o$. The same number $N_o$ is contained in the security check routine in machine language in a File Y.

When the disk 16 is inserted in the computer, the computer first executes the initializing routine, before the main application program or other data to be protected is read into the computer's core (from which it could be read onto another disk for the purpose of making an unauthorized copy). The security check procedure concludes the initializing routine.

The security check procedure includes instructions that increment the number $N_o$ initially contained in File Y to obtain a new number $N_1$, which is then stored in File Y. Thereafter, the number in File Y is compared with the number then in File X. If the numbers are equal, the computer is enabled to read the main application program into the core. If the numbers are not equal, the computer is instructed to obliterate all files including those containing the main application program.

Clearly, the latter result will obtain unless the number $N_o$ initially stored in File X has previously been incremented by the same amount that the number $N_o$ initially stored in File Y was incremented.

A special apparatus 12 is incorporated into the jacket of the disk as an integral part of the jacket. The purpose of this special apparatus is to increment the number in File X each time the disk 16 is played. The incrementing occurs within the first two revolutions of the disk 16 and thus is completed before the security check procedure is executed. In normal use, the special apparatus 12 causes the number in File X to equal the number in File Y so that the main application program can be read into the core of the computer by the computer's read/write 18 head under control of the initializing routine.

If an unauthorized copy is made of the protected data once it has been read into the core of the computer, and if this copy is recorded on a conventional disk, rather than a secure disk like that of the present invention, the copy will be unusable simply because the conventional disk lacks the special apparatus 12 for incrementing the number in File X. Thus, the apparatus and procedure of the present invention frustrate unauthorized copying.

Further, if the special apparatus 12 is tampered with and thereby rendered inoperative, the original disk will become unusable, since File X cannot be incremented without the use of the special apparatus.

As shown in FIG. 1, the special apparatus 12 comprises, in this illustrative embodiment, a read/write head 20, and amplifier 22, and incrementing and storing system 24, and a battery 26 which powers the other components. All of this special apparatus 12 is mounted in the jacket of the disk. The read/write head 20 is extremely thin and is positioned on the jacket in such a fixed position that it has access to only the special dedicated security track 14 on the disk 16.

It is assumed for purposes of illustration that the track 14 of the disk 16 that is dedicated to security is Track 3. The special apparatus of FIG. 1 operates as follows.

Upon being commanded to read in the program from the disk 16 the computer starts the disk 16 to rotate. During the first revolution, the disk's read/write head 20 senses an initial sync pulse on Track 3, the dedicated track 14. This sync pulse is used to turn on the amplifier 22 and the incrementing and storing system 24.

As the disk 16 continues to turn, the disk's read/write head 20 reads a number $N_o$ that follows the first sync pulse on Track 3. That number, $N_o$, is incremented by a number stored in the incrementing and storing system 24 to obtain an incremented number $N_1$.

During the second revolution of the disk 16, the sync pulse is again sensed by the disk's read/write head 20. This second sync pulse switches the amplifier 22 to pass the number $N_1$ to the disk 16 where $N_1$ is written over $N_o$ on Track 3. The incrementing and storing system 24 causes the amplifier 22 to ignore further sync pulses that may subsequently be read. The operating system directory assigns a name to Track 3: Track 3 is File X.

As described above, the program includes a security check procedure in which a number $N_o$, stored in machine language in the initializing routine, is incremented in the same manner as before, to produce in a File Y the number $N_1$. The initializing routine then compares the number in File X with the number in File Y. If the number in File X equals the number in File Y, then the protected data is transferred by the computer's read/write head 18 into the computer's core. If the number in File X does not equal the number in File Y, then the security check procedure commands the computer's read/write head 18 to fill all files, including those containing the protected data, with meaningless numbers.

In the simplest form of this embodiment the numbers in the Files X and Y are incremented by the same amount each time the disk is played. In a slightly more complicated variation, the incremental amount changes each time the disk is played. This can be accomplished by altering a number stored in a special increment file each time the disk is played.

Conclusion

Thus, three embodiments have been described of a method and apparatus for frustrating the unauthorized copying of protected data that has been recorded on a floppy disk. Clearly the method and apparatus are adaptable to other recording media.

In each embodiment, a fingerprint is imparted to an authorized disk, which permits the authorized disk to be distinguished physically from an ordinary disk on which an unauthorized copy would be made.

In the first embodiment the fingerprint is an intentionally introduced defective area having a random location. In the second embodiment the fingerprint is an unalterable magnetic signature recorded on a special read-only portion of the disk. In the third embodiment, the fingerprint is a magnetic signature that is recorded on a dedicated track of the disk and that is altered each time the disk is used.

In each embodiment, the initializing routine recorded on the disk contains a security check procedure that tests for the presence of the known fingerprint, and that prevents read-out of the protected data if the fingerprint is absent, as it would be from an unauthorized copy.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A method for frustrating the unauthorized copying of protected data that has been recorded in an authorized medium that includes an initializing routine that is executed before any of the protected data is read out of the authorized medium, said method comprising the steps of:

(a) establishing a File X;
   (b) initially storing in File X a particular number $N_o$;
   (c) providing an incrementing apparatus that is present only when an authorized medium is used, for generating a series of increments and for successively incrementing the number in File X each time the medium is read, said incrementing apparatus not being present when an unauthorized medium is used and being rendered inoperative when an authorized medium has been tempered with;
   (d) establishing a File Y as part of the initializing routine;
   (e) initially storing in File Y the number $N_o$ used in step (b);
   (f) incrementing the number in File Y successively each time the medium is read, in accordance with the same series of increments that was generated in step (c);
   (g) testing to determine whether the number in File X equals the number in File Y;
   (h) preventing read-out of the protected data when the number in File X does not equal the number in File Y.

2. Apparatus for frustrating the unauthorized copying of protected data that has been recorded therein along with an initializing routine that is executed before the protected data can be read out, said initializing routine including instructions for generating a first series of increments and for successively incrementing a first number stored in said initializing routine each time said apparatus is used, said apparatus comprising:

a medium; and,
   incrementing means associated with said medium for generating a second series of increments identical to said first series of increments and for successively incrementing a second number equal to said first number and stored in a particular file in said medium each time said medium is read, whereby an unauthorized copy, which lacks said incrementing means, can be recognized by said initializing routine in time to prevent read-out of the protected data by any inequality between successive increments of said first number and corresponding successive increments of said second number.

* * * * *